United States Patent
Kraus et al.

(10) Patent No.: US 12,092,162 B2
(45) Date of Patent: Sep. 17, 2024

(54) BEARING RING

(71) Applicant: AKTIEBOLAGET SKF, Gothenburg (SE)

(72) Inventors: Sebastian Kraus, Schwanfeld (DE); Maximilian Kuehnlein, Hammelburg (DE)

(73) Assignee: AKTIEBOLAGET SKF, Gothenburg (SE)

( * ) Notice: Subject to any disclaimer, the term of this patent is extended or adjusted under 35 U.S.C. 154(b) by 183 days.

(21) Appl. No.: 17/859,290

(22) Filed: Jul. 7, 2022

(65) Prior Publication Data

US 2023/0026017 A1 Jan. 26, 2023

(30) Foreign Application Priority Data

Jul. 16, 2021 (DE) .......................... 102021207590.8

(51) Int. Cl.
*F16C 19/16* (2006.01)
*F16C 33/58* (2006.01)
*F16C 35/077* (2006.01)

(52) U.S. Cl.
CPC ............ *F16C 35/077* (2013.01); *F16C 19/16* (2013.01); *F16C 33/585* (2013.01); *F16C 33/586* (2013.01)

(58) Field of Classification Search
CPC ........ F16C 19/06; F16C 19/16; F16C 19/525; F16C 33/585; F16C 33/586; F16C 35/077
See application file for complete search history.

(56) References Cited

U.S. PATENT DOCUMENTS

| | | | | |
|---|---|---|---|---|
| 9,850,949 B2 * | 12/2017 | Spies | ...................... | F16C 43/04 |
| 10,087,986 B2 * | 10/2018 | Wendt | .................... | F16C 35/063 |
| 10,364,839 B2 * | 7/2019 | Knoche | ................... | F16C 25/08 |
| 2015/0308504 A1 * | 10/2015 | Katsaros | .............. | F16C 27/066 |
| | | | | 264/274 |
| 2016/0236510 A1 * | 8/2016 | Beck | ...................... | F16C 35/077 |

FOREIGN PATENT DOCUMENTS

| | | | |
|---|---|---|---|
| DE | 102019103126 A1 * | 8/2020 | |
| JP | 2003343590 A * | 12/2003 | |
| JP | 2011112191 A * | 6/2011 | |
| KR | 20030066441 A * | 8/2003 | |
| WO | WO-2019031050 A1 * | 2/2019 | .............. F16C 19/06 |

OTHER PUBLICATIONS

DE102019103126-A1.*
JP2011112191-A.*
WO2019031050-A1.*

* cited by examiner

*Primary Examiner* — Phillip A Johnson
(74) *Attorney, Agent, or Firm* — J-TEK LAW PLLC; Scott T. Wakeman; Mark A. Ussai

(57) ABSTRACT

A bearing ring has first and second cylindrical surfaces, first and second annular side surfaces and at least one compensation element attached to the bearing ring, preferably in a groove at a junction of the first cylindrical surface and the first annular side surface. The bearing ring is manufactured from a first material having a first coefficient of thermal expansion and is configured to be connected to a component that is manufactured from a second material having a second coefficient of thermal expansion, and the at least one compensation element is manufactured from a third material having a coefficient of thermal expansion that is greater than or equal to the coefficient of thermal expansion of the second material. Also a bearing assembly including the bearing ring and the component.

15 Claims, 3 Drawing Sheets

BEARING RING

CROSS-REFERENCE

This application claims priority to German patent application no. 10 2021 207 590.8 filed on Jul. 16, 2021, the contents of which are fully incorporated herein by reference.

TECHNOLOGICAL FIELD

The present disclosure is directed to a bearing ring for a bearing unit in which the bearing ring is manufactured from a first material and the bearing ring is configured to be connected to a component that is manufactured from a second material.

BACKGROUND

In bearing assemblies in which a component that receives a bearing unit in a rotationally fixed manner is manufactured from a different material than the bearing unit or the bearing ring itself to be connected to the component in a rotationally fixed manner, due to unequal coefficients of thermal expansion there is a risk that the component and the bearing ring will rotate with respect to each other in operation. Especially in the automotive field, in the drive train in particular of electric motors, aluminum housing elements are often installed into which bearings are pressed that are configured to support a rotating shaft or a rotating rotor relative to the stationary aluminum housing. However, these bearings or their corresponding bearing rings are usually manufactured from a rolling-element bearing steel and therefore have different coefficients of thermal expansion than the receiving aluminum housing. This causes the bearing rings to expand less quickly in operation than the receiving aluminum housing, which in turn causes the bearings that are held with a press fit to loosen. Despite the press fit, the bearing rings can thereby rotate relative to the aluminum housing, and this leads to a high torque loss or energy loss and to heavy wear of the bearing and of the housing.

In the prior art, O-rings have therefore often been introduced into the outer surface of the bearing rings, which should increase the friction between bearing ring and housing even in the case of different expansions. However, these O-rings are made of an elastomer material that quickly ages and wears, in particular in oil-filled housings. In addition, the oil environment leads to a reduction of friction, and this counteracts the ability of the O-rings to prevent rotation. Furthermore, it is known to increase the press fit, which, however, leads to high preload in the bearing and to damage to the bearing overall. In particular at cold temperatures this can cause the bearing and/or the housing to be damaged.

SUMMARY

An aspect of the present disclosure is therefore to provide a bearing assembly that ensures a good press fit of the bearing in a housing even when the bearing and the housing have different coefficients of thermal expansion.

In the following a bearing ring and a bearing assembly including the bearing ring is disclosed in which the bearing ring is manufactured from a first material and the bearing ring is configured to be connected to a component that is manufactured from a second material. According to a further aspect of the present application the bearing assembly comprises a bearing unit including the aforementioned bearing ring as a first bearing ring and a second bearing ring that are disposed such that they are rotatable with respect to each other. The bearing unit is integrated into a component such that the bearing unit and the component are rotationally fixed. Here the component is preferably manufactured from aluminum or an aluminum material, while the bearing ring or the bearing rings of the bearing unit are manufactured from a rolling-element bearing steel. The bearing unit can be any type of rolling-element bearing, hybrid rolling-element bearing, or plain bearing.

In order to attach the bearing ring in the component without it loosening due to the presence of materials having different coefficients of thermal expansion, at least one compensation element is attached to the bearing ring, which compensation element is manufactured from a third material that has a coefficient of thermal expansion that is higher than, similar to, or equal to that of the second material.

If the material of the compensation element has a similar or identical coefficient of thermal expansion to that of the material of the component, this compensation element expands similarly to the material of the component receiving the bearing ring. However, in particular with plastic compensation elements, a higher expansion coefficient can also be advantageous so that the compensation element expands to a greater extent and/or more quickly than the material of the component or of the bearing ring. It can thereby be ensured that bearing ring and component always maintain a connection to each other such that they are rotationally fixed even with high thermal fluctuations and very different coefficients of thermal expansion of the bearing ring and component. A rotating and a torque-transmission loss associated therewith or wear associated therewith can thus be reliably prevented. Here in the bearing assembly the compensation element is advantageously both in contact with the bearing ring and in contact with the component.

Here it is particularly preferred when the second and the third material are identical. An identical thermal behavior of the compensation element and the component can thereby be ensured.

According to a further preferred exemplary embodiment, the compensation element is attached to the bearing ring by a press fit. This allows for a particularly simple attachment, in particular when the compensation element is manufactured from a metallic material, such as, for example, aluminum.

In an analogous manner, an exemplary embodiment for the bearing assembly is also preferred in which the bearing ring itself is attached to the component by a press fit.

Alternatively the compensation element can also be overmolded onto the bearing ring. This is preferred in particular when the compensation element is manufactured from plastic. Of course, however, a metallic compensation element can also be overmolded, and a plastic element can be attached by a press fit.

If the compensation element is attached by a press fit to the bearing ring and the bearing ring is also attached by a press fit to the receiving component, it is preferred that an overlap between the compensation element and the component is different from an overlap between the bearing ring and the compensation element. This is advantageous in particular when the compensation element is annular. Due to the different overlaps, it can be ensured that there is always to be expected a press fit between the compensation element and the bearing ring and between the compensation element and the component at all temperatures.

Here in particular with a compensation element attached to an outer ring, it is advantageous that the overlap between outer ring and compensation element is greater than the overlap between compensation element and component, such as, for example, a housing.

As mentioned above, it is preferred for the compensation element to be annular. This ensures a uniform and maximal abutment surface on the bearing ring or on the component.

However, it is also conceivable to form the compensation element as discrete elements that are disposed around the bearing ring/the component, preferably in a uniformly distributed manner.

According to a further preferred exemplary embodiment, the bearing ring includes a receptacle in which the compensation element is disposed. This receptacle can be configured as an annular groove in order to receive, for example, an annular compensation element, but it is also possible that the receptacle is configured as discrete individual receptacles in which corresponding discrete compensation elements are inserted.

The bearing ring itself usually includes two lateral surfaces and two end faces at the edge. The receptacle is preferably disposed at the edge and can be configured as a groove formed in the outer surface into which the compensation element is injected.

An exemplary embodiment is particularly preferred in which the receptacle is configured open both to the end side and to one of the outer surfaces so that the compensation element can be easily inserted. Here in particular the receptacle and the compensation element are configured annular.

According to a further preferred exemplary embodiment, a receptacle is not only formed on one end side but rather on both end sides so that the bearing ring includes a compensation element on both edges. On the one hand the fixing of the bearing unit in the component can thereby be increased, and on the other hand a tilting of the bearing ring in the component, which can lead to a degraded running behavior, can be avoided.

Further advantages and advantageous embodiments are specified in the description, the drawings, and the claims. Here in particular the combinations of features specified in the description and in the drawings are purely exemplary so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
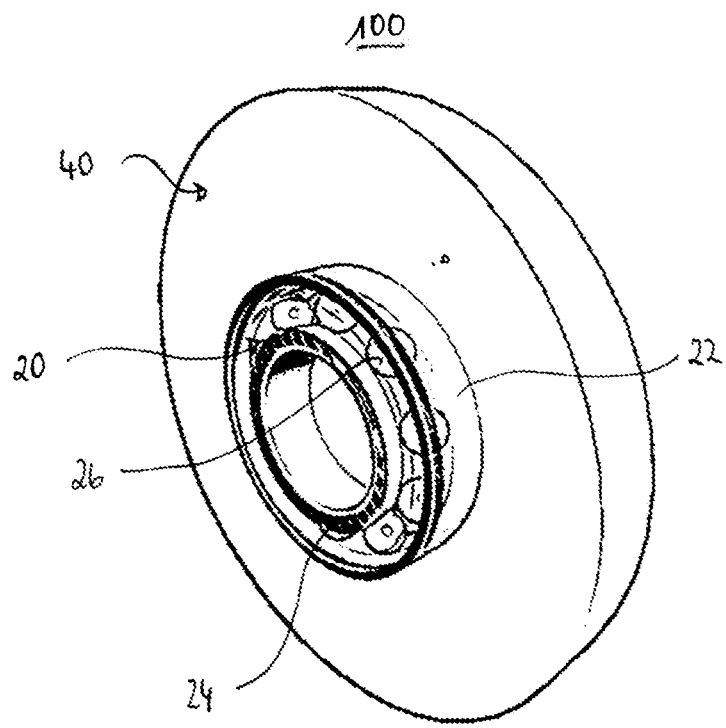
FIG. 1 is a schematic perspective view of a bearing assembly according to a preferred exemplary embodiment of the present disclosure which includes a housing and a bearing unit.

FIG. 1 schematically shows a bearing assembly 100 including a bearing unit 20 that is received in a component 40. As can also be seen in particular from FIGS. 2 and 3, in the exemplary embodiments depicted, the bearing unit 20 is configured as a rolling-element bearing, in particular as a ball bearing, and includes a bearing outer ring 22, a bearing inner ring 24, and rolling elements 26 in the form of balls disposed therebetween. The rolling elements 26 themselves can be received in a cage (not depicted) in order to space the rolling elements from one another and to guide them.

Of course, other types of rolling-element bearings, such as, for example, tapered roller bearings, cylindrical roller bearings, or spherical roller bearings, in order to name only a few, can equally be present in the bearing unit 20. It is also possible to form the bearing unit 20 not as a rolling-element bearing but rather as a plain bearing.

It is problematic with such bearing assemblies 100 that the component 40 and the bearing unit 20, or in particular the bearing ring (in the exemplary embodiment depicted the outer ring 22), are usually manufactured from different materials. Thus in particular in automobile manufacturing, often in the drive train or in electric motors, the component 40 is manufactured from aluminum or an aluminum alloy while the bearing ring is manufactured from a rolling-element bearing steel. In operation or also at low temperatures in winter, the different material properties, in particular their different coefficients of thermal expansion, cause the component 40 and the bearing unit 20 to behave differently, in particular to expand differently. Since the bearing unit 20 is usually disposed with a press fit in the component 40, this different thermal expansion leads to a loosening of the press fit of the bearing unit and thus to a relative movement or co-rotation between the bearing ring 22 and the component 40. However, this co-rotation leads to increased wear between the bearing unit 20 and the housing 40 as well as to transmission losses that are to be prevented.

Figure 2:
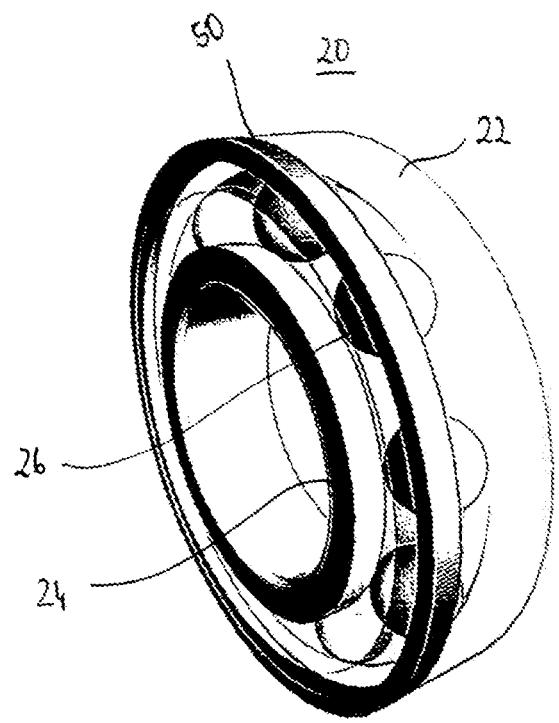
FIG. 2 is a schematic perspective view of the bearing unit of FIG. 1.
Figure 3:
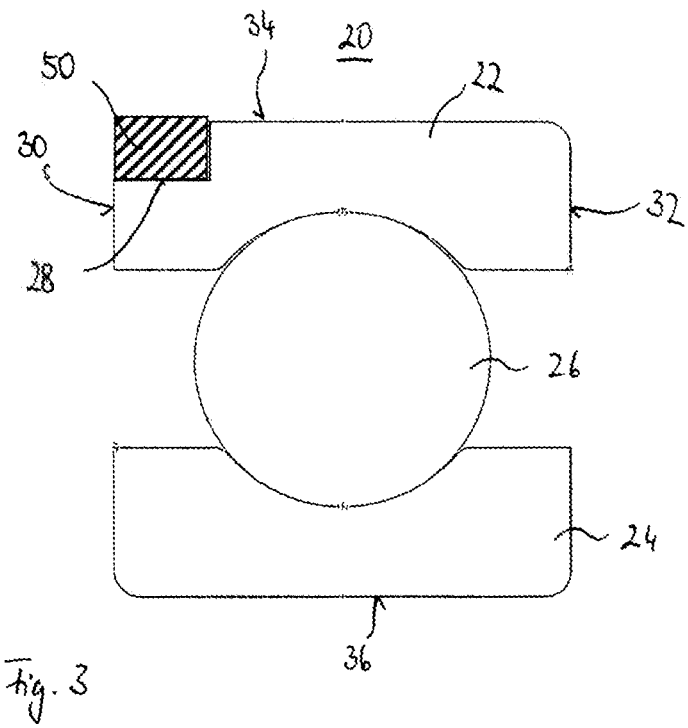
FIG. 3 is a schematic sectional view through the bearing unit of FIG. 2.
Figure 4:
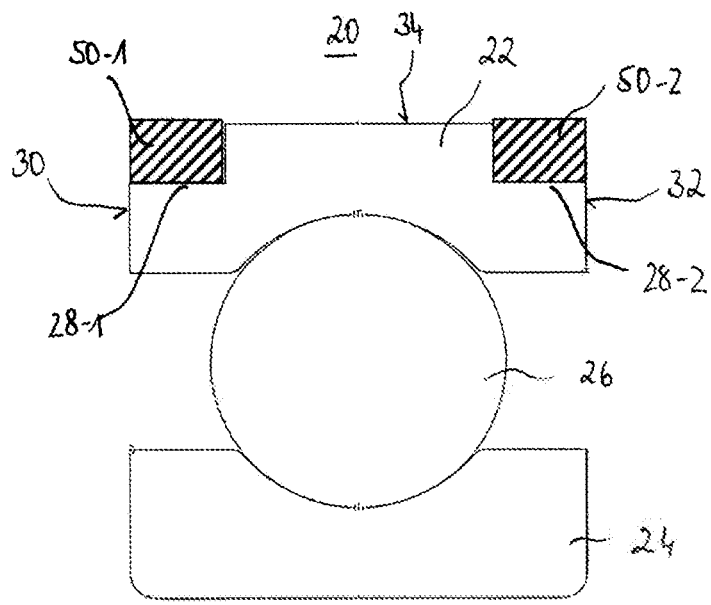
FIG. 4 is a schematic sectional view of a bearing unit according to another preferred exemplary embodiment of the disclosure.

In order to avoid a loosening of the press fit between bearing unit 20 and the component 40, as can be from FIGS. 2 to 4, a groove 28 is provided on the bearing ring 22 in which a so-called compensation element 50 is disposed.

In the exemplary embodiments depicted, this compensation element 50 is annular and manufactured from a material that has a coefficient of thermal expansion that is similar to that of the component 40. The compensation element 50 is preferably disposed at the edge of one (see FIG. 3) or on both (see FIG. 4) end surfaces 30, 32 of the bearing ring 22. Here the groove 28, as can be seen in particular from FIGS. 3 and 4, is open both to the corresponding end surface 30, 32 and the outer surface 34 of the bearing ring 22. In the exemplary embodiment depicted, in which the compensation element 50 is attached to the bearing outer ring 22, the outer surface 34 that faces the component 40 that receives the bearing unit 20 is the radially outer surface 34. If the compensation element were disposed on the inner ring 24, the groove 28 would be formed in the radially inner surface 36 of the inner ring.

If the compensation element 50 as depicted in FIG. 4 is disposed on both end sides 30, 32 of the bearing ring 22, then a tilting of the bearing ring can also be counteracted, and this helps to ensure improved running properties of the bearing ring even at high temperatures.

As can furthermore be seen from FIGS. 2 to 4, the compensation element 50 is preferably attached to the bearing outer ring 22 by a press fit.

Here it is preferred in particular to adapt the overlap between compensation element 50 and bearing ring 22 or between bearing ring 22 and component 40 such that the press fit is always ensured. As used herein, an "overlap" is understood to mean the difference in the size or diameter of the two elements joined to each other by press fit. In the exemplary embodiments depicted in FIGS. 1 to 4 in which the compensation element 50 is disposed on the bearing outer ring 22 and the bearing ring 22 is disposed in the housing 40 with a press fit, the overlap corresponds to the size difference between the compensation element 50 and the housing 40, and between the compensation element 50 and the bearing outer ring 22.

Figure 5:
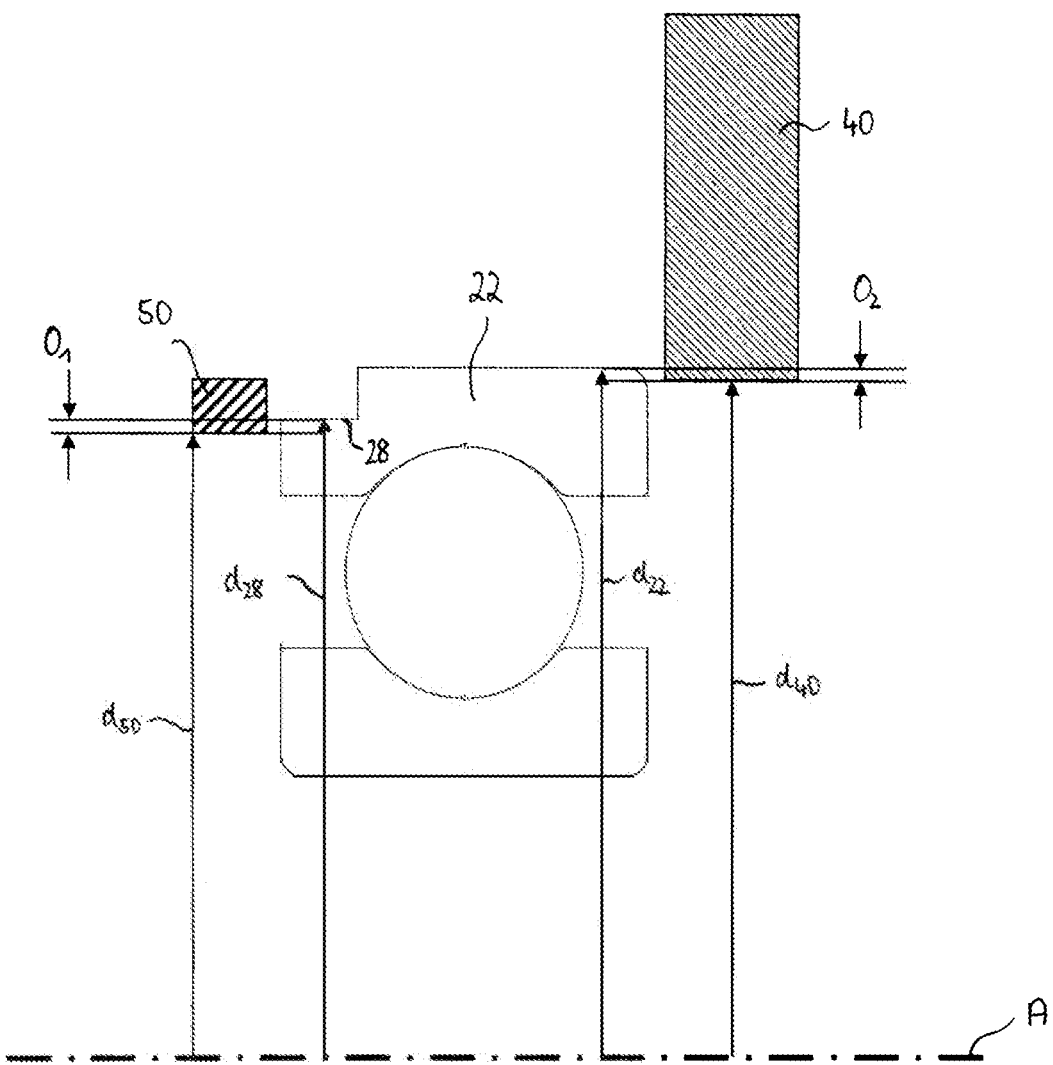
FIG. 5 is a schematic view, which is not drawn to scale, that illustrates in an exaggerated manner the relative size of the components of the bearing assembly of FIG. 1.

This overlap situation is depicted in FIG. 5, which schematically places the sizes of the bearing unit 20 in relation to the compensation element 50 and the component 40, wherein all elements are shown in a non-assembled state. However, this Figure shows the size differences in an exaggerated manner and is to be understood merely as explanation and not as an exploded view.

As can be seen from FIG. 5, in the rest state (when the components are at the same temperature and/or are not subject to outside forces) the component 50 has an inner diameter d50 that is smaller than the outer diameter d28 of the groove 28 in the bearing ring 22. The difference between the diameter d50 and the diameter d28 is designated as overlap O1. During assembly, the compensation element 50 is heated to the extent that it changes its size, i.e., expands, and thus can be pushed onto the bearing ring 22 or into the groove 28. The subsequent cooling in turn ensures the corresponding press fit of the compensation element 50 on the bearing ring 22, more precisely, in the groove 28.

In an analogous manner, the overlap O2 between the bearing ring 22 and the component 40 is determined by the difference between the inner diameter d40 of the component 40 and the outer diameter d22 of the bearing ring 22.

As can furthermore be seen from FIG. 5, in the exemplary embodiment the overlap O1 between the compensation element 50 and the bearing ring 22, more precisely the groove 28, is greater than the overlap O2 between the component 40 and the bearing ring 22. Due to this different overlap it can be ensured that the compensation element is always in press fit with the bearing ring 22 even when it expands due to thermal heating. When the compensation ring 50 is installed on the bearing ring 22 the compensation element 50 has the same outer diameter d22 as the bearing 22. Therefore the overlap O2 also arises between the compensation element 50 and the component 40.

The overlap O2 between the compensation element 50 and the component 40 can therefore also be smaller, since the compensation element 50 and the component 40 have essentially the same, or, in particular in the case of plastic, also greater thermal expansion properties, and thus the overlap ideally remains constant between compensation element 50 and the component 40. This applies in particular when the component 40 and the compensation element 50 are manufactured from the same material.

The overlap set in this way ensures that at all temperatures the compensation element 50 is in a press fit with the bearing ring 22 and the component 40. It can thereby be ensured that even with high temperature fluctuations and large thermal expansions, the compensation element 50 is always in contact with the bearing ring 22 and the component 44 and this ensures a connection between the bearing unit 20 and the component 40 such that are rotationally fixed.

Here it is preferred in particular when the compensation element 50 is manufactured from the same material as the component 40; however, it is also possible to manufacture the compensation element 50 from a different material, which, however, has thermal properties similar to those of the material of the component 40. The material can also have a higher coefficient of thermal expansion, which is advantageous in particular, but not exclusively, with a compensation element manufactured from plastic.

In summary, with the aid of the above-described compensation element it can be ensured that the bearing unit can be attached in a component such that they are rotationally fixed even when different materials and high temperature differences are to be expected. Since the thermal expansion properties of the compensation element and component are essentially identical, by suitable choice of the overlaps in particular it can be achieved that the overlap between the component and the compensation ring is more or less constant, which leads to a good press fit. However, the overlap between the compensation element and the bearing ring can also be chosen such that the compensation element does not loosen and the bearing ring can rotate relative to the compensation element. Rotation of the bearing relative to a housing or shaft can thereby be reliably prevented.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearing rings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

100 Bearing assembly
20 Bearing unit
22 Bearing outer ring
24 Bearing inner ring
26 Rolling element
28 Groove
30; 32 End surfaces
34; 36 Outer surfaces
40 Component
50 Compensation element
D5 Inner diameter of the compensation element
D28 Outer diameter of the groove 28
D22 Outer diameter of the bearing outer ring
D40 Inner diameter of the component 40

O1; O2 Overlap

What is claimed is:

1. A bearing assembly comprising:
a first bearing ring and a second bearing ring configured to rotate relative to the first bearing ring, the first bearing ring including a first cylindrical surface, a second cylindrical surface, a first annular side surface, a second annular side surface and a first annular groove at a junction of the first cylindrical surface and the first annular side surface,
a component configured to support the first bearing ring, and
a first compensation ring mounted in the first annular groove,
wherein the first annular groove is open to the first cylindrical surface and the first annular side surface,
wherein the first bearing ring is formed from a first material having a first coefficient of thermal expansion and the component is formed from a second material having a second coefficient of thermal expansion and the compensation ring is formed from a third material having a third coefficient of thermal expansion,
wherein the third coefficient of thermal expansion is greater than or equal to the second coefficient of thermal expansion,
wherein the first material is bearing steel,
wherein the second and third materials are metal, and
wherein the first bearing ring is connected to the component such that the first cylindrical surface of the bearing ring and a cylindrical metal surface of the compensation ring contact the component.

2. The bearing assembly according to claim 1,
wherein the third material is identical to the second material.

3. The bearing assembly according to claim 1,
including a second annular groove at a junction of the first cylindrical surface and the second annular side surface and a second compensation ring in the second annular groove.

4. The bearing assembly according to claim 1,
wherein the first bearing ring is an outer bearing ring,
wherein the first cylindrical surface is an outer surface of the first bearing ring,
wherein the component includes an opening, and
wherein the first bearing ring is mounted in the opening.

5. The bearing assembly according to claim 1,
wherein the first compensation ring is connected to the first bearing ring by a press fit.

6. The bearing assembly according to claim 1,
wherein the second material and the third material comprise aluminum.

7. A bearing assembly comprising:
a first bearing ring and a second bearing ring configured to rotate relative to the first bearing ring, the first bearing ring including a first cylindrical surface, a second cylindrical surface, a first annular side surface, a second annular side surface and a first annular groove at a junction of the first cylindrical surface and the first side surface,
a component configured to support the first bearing ring, and
a first compensation ring mounted in the first annular groove,
wherein the first annular groove is open to the first cylindrical surface and the first annular side surface,
wherein the first bearing ring is formed from a first material having a first coefficient of thermal expansion and the component is formed from a second material having a second coefficient of thermal expansion and the compensation ring is formed from a third material having a third coefficient of thermal expansion,
wherein the third coefficient of thermal expansion is greater than or equal to the second coefficient of thermal expansion,
wherein the first bearing ring is connected to the component such that the first cylindrical surface of the bearing ring and a cylindrical surface of the compensation ring contact the component,
wherein the first compensation ring is connected to the first bearing ring by a press fit,
wherein the first bearing ring is connected to the component by a press fit, and
wherein an overlap between the first bearing ring and the component is different than an overlap between the first bearing ring and the first compensation ring.

8. The bearing assembly according to claim 7,
wherein the overlap between the first compensation ring and the first bearing ring is greater than the overlap between the component and the first bearing ring.

9. The bearing assembly according to claim 8,
wherein second material and the third material comprise aluminum.

10. The bearing assembly according to claim 8,
including a second annular groove at a junction of the first cylindrical surface and the second side surface, and
a second compensation ring in the second groove,
wherein a coefficient of thermal expansion of the second compensation ring is greater than or equal to the second coefficient of thermal expansion.

11. A bearing assembly comprising:
a first bearing ring and a second bearing ring configured to rotate relative to the first bearing ring, the first bearing ring including a first cylindrical surface, a second cylindrical surface, a first annular side surface, a second annular side surface and a first annular groove in the first cylindrical surface,
a component configured to support the first bearing ring, and
a first compensation ring mounted in the first annular groove,
wherein the first bearing ring is formed from a first material having a first coefficient of thermal expansion and the component is formed from a second material having a second coefficient of thermal expansion and the compensation ring is formed from a third material having a third coefficient of thermal expansion,
wherein the third coefficient of thermal expansion is greater than or equal to the second coefficient of thermal expansion,
wherein the first material is bearing steel,
wherein the second and third materials are metal, and
wherein the first bearing ring is connected to the component such that the first cylindrical surface of the bearing ring and a cylindrical metal surface of the compensation ring contact the component.

12. The bearing assembly according to claim 11,
wherein the second and third materials comprise aluminum.

13. The bearing assembly according to claim 11,
including a second annular groove in the first cylindrical surface, and
a second compensation ring in the second annular groove, wherein the second compensation ring is formed of a metal having a coefficient of thermal expansion greater than or equal to the second coefficient of thermal expansion.

14. The bearing assembly according to claim 13, wherein the second compensation ring is formed from a same material as the first compensation ring.

15. The bearing assembly according to claim 13, wherein the first annular groove is open to the first cylindrical surface and the first annular side surface and the second annular groove is open to the first cylindrical surface and the second annular side surface.

\* \* \* \* \*